US012645526B2

(12) United States Patent
Kamila

(10) Patent No.: US 12,645,526 B2
(45) Date of Patent: Jun. 2, 2026

(54) AUTOMATED REMEDIATION OF CLOUD PLATFORM ERRORS

(71) Applicant: Capital One Services, LLC, McLean, VA (US)

(72) Inventor: Nilayam Kumar Kamila, Wilmington, DE (US)

(73) Assignee: Capital One Services, LLC, McLean, VA (US)

( * ) Notice: Subject to any disclaimer, the term of this patent is extended or adjusted under 35 U.S.C. 154(b) by 39 days.

(21) Appl. No.: 18/622,056

(22) Filed: Mar. 29, 2024

(65) Prior Publication Data

US 2025/0307065 A1     Oct. 2, 2025

(51) Int. Cl.
*G06F 11/00*     (2006.01)
*G06F 11/07*     (2006.01)
*H04L 9/40*     (2022.01)

(52) U.S. Cl.
CPC .......... *G06F 11/0793* (2013.01); *H04L 63/20* (2013.01)

(58) Field of Classification Search
CPC ............................ G06F 11/0793; H04L 63/20
See application file for complete search history.

(56) References Cited

U.S. PATENT DOCUMENTS

| | | | |
|---|---|---|---|
| 11,108,859 B2 | 8/2021 | Das et al. | |
| 11,288,138 B1 | 3/2022 | Freilich et al. | |
| 11,475,353 B2 | 10/2022 | Rangasamy | |
| 11,537,391 B2 | 12/2022 | Franzen et al. | |
| 2018/0129549 A1* | 5/2018 | Fredericks | G06F 11/0709 |
| 2020/0293393 A1* | 9/2020 | Saito | G06F 11/079 |
| 2022/0222350 A1 | 7/2022 | Franzen et al. | |
| 2023/0120174 A1 | 4/2023 | Seck et al. | |

OTHER PUBLICATIONS

Nilayam Kumar Kamila, et al., "A near-optimal & load balanced resilient system design for high-performance computing platform," Cluster Computing (2023), 16 pages.
Nilayam Kumar Kamila, et al., "A Machine Learning Design Approach for System Performance and Traffic Resiliency in Cloud Platform," Indian Journal of Natural Sciences, vol. 12, No. 70 (2022), pp. 39125-39137.
Ivo Zenden, et al., "On the Resilience of Machine Learning-Based IDS for Automotive Networks," arXiv.org (2023), 8 pages.
(Continued)

*Primary Examiner* — Joshua P Lottich
(74) *Attorney, Agent, or Firm* — Harrity & Harrity, LLP

(57) ABSTRACT

In some implementations, a remediation system may receive, from a set of monitoring software, information associated with the cloud platform. The remediation system may apply a set of data security rules to the information to generate masked information. The remediation system may provide the masked information to a machine learning model to receive a classification associated with the masked information and an indication of a suggested remediation action. The remediation system may determine that the classification is associated with an error. The remediation system may transmit, to the cloud platform, a command to perform the suggested remediation action based on determining that the classification is associated with the error.

20 Claims, 10 Drawing Sheets

(56)              References Cited

OTHER PUBLICATIONS

Robert P. Hirten, et al., "A machine learning approach to determine resilience utilizing wearable device data: analysis of an observational cohort," JAMIA Open, vol. 6, No. 2 (2023), 10 pages.

Nilayam Kumar Kamila, et al., "Machine learning model design for high performance cloud computing & load balancing resiliency: An innovative approach," Journal of King Saud University—Computer and Information Sciences, vol. 34 (2022), pp. 9991-10009.

Alexander Petrilli, et al., "Measuring Resilience in Artificial Intelligence and Machine Learning Systems," SEI Blog (2019) 10 pages, retrieved from https://insights.sei.cmu.edu/blog/measuring-resilience-in-artificial-intelligence-and-machine-learning-systems/.

Co-pending U.S. Appl. No. 18/358,670, entitled "Building and Providing a Remediation Library for Cloud-Based Applications" and filed Jul. 25, 2023.

Co-pending U.S. Appl. No. 18/305,095, entitled "Compliance for Cloud-Based Applications and Computer Systems Using Machine Learning" and filed Apr. 21, 2023.

Co-pending U.S. Appl. No. 18/402,479, entitled "Software Platform Health Analysis" and filed Jan. 2, 2024.

* cited by examiner

100

110
Apply a set of data
security rules

Remediation
system

115
Masked information

120
Train model using the
masked information

Machine
learning
model

100

135
Segment the masked information by time

140
Segmented masked information

145
Classification and suggested remediation action

Remediation system

Machine learning model

100

150
Instructions for UI indicating
suggested remediation action

155
Approval of the suggested
remediation action

Remediation
system

Administrator
device

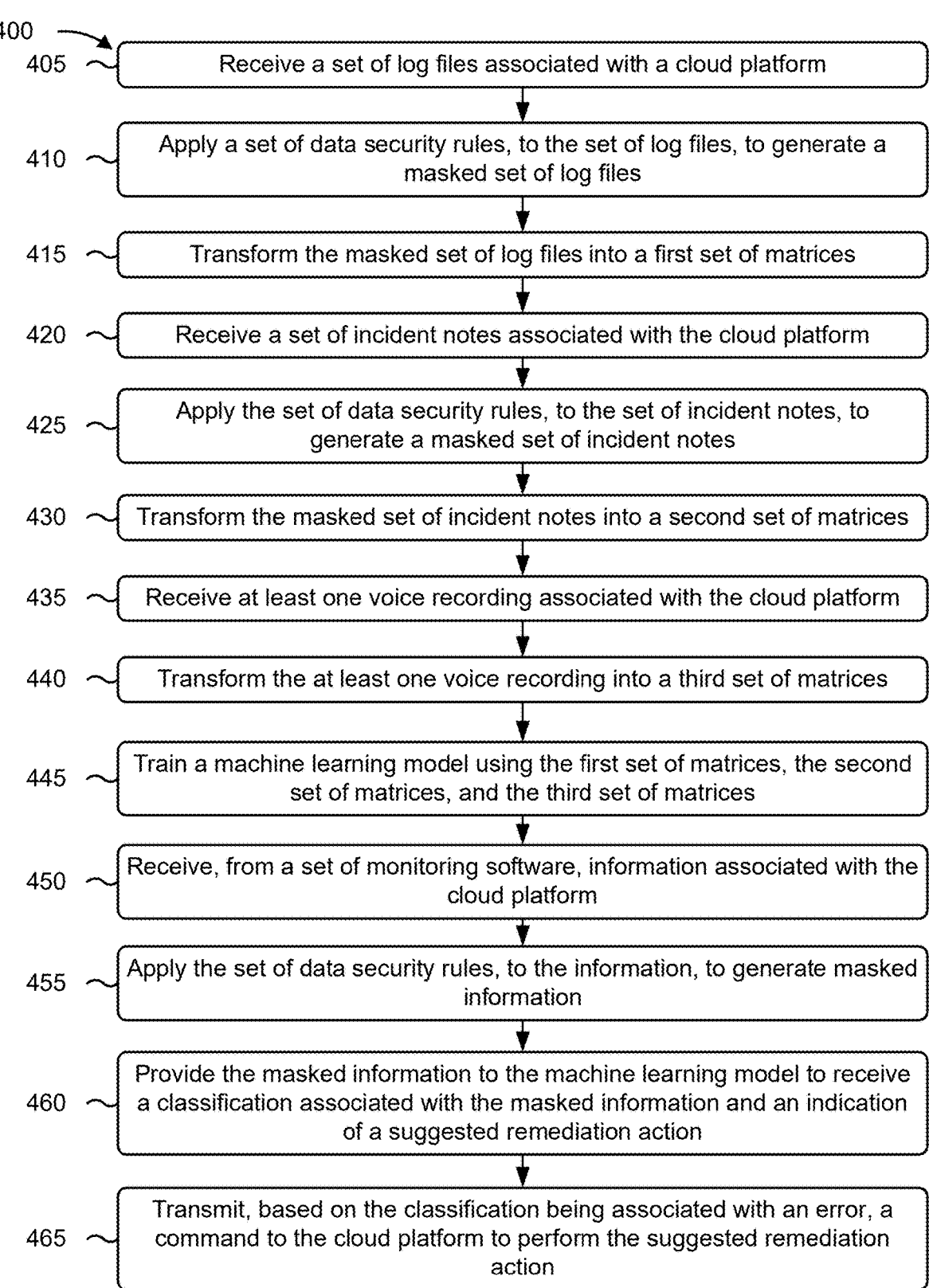

400

405 — Receive a set of log files associated with a cloud platform

410 — Apply a set of data security rules, to the set of log files, to generate a masked set of log files 415 — Transform the masked set of log files into a first set of matrices 420 — Receive a set of incident notes associated with the cloud platform 425 — Apply the set of data security rules, to the set of incident notes, to generate a masked set of incident notes 430 — Transform the masked set of incident notes into a second set of matrices 435 — Receive at least one voice recording associated with the cloud platform 440 — Transform the at least one voice recording into a third set of matrices 445 — Train a machine learning model using the first set of matrices, the second set of matrices, and the third set of matrices 450 — Receive, from a set of monitoring software, information associated with the cloud platform 455 — Apply the set of data security rules, to the information, to generate masked information 460 — Provide the masked information to the machine learning model to receive a classification associated with the masked information and an indication of a suggested remediation action 465 — Transmit, based on the classification being associated with an error, a command to the cloud platform to perform the suggested remediation action

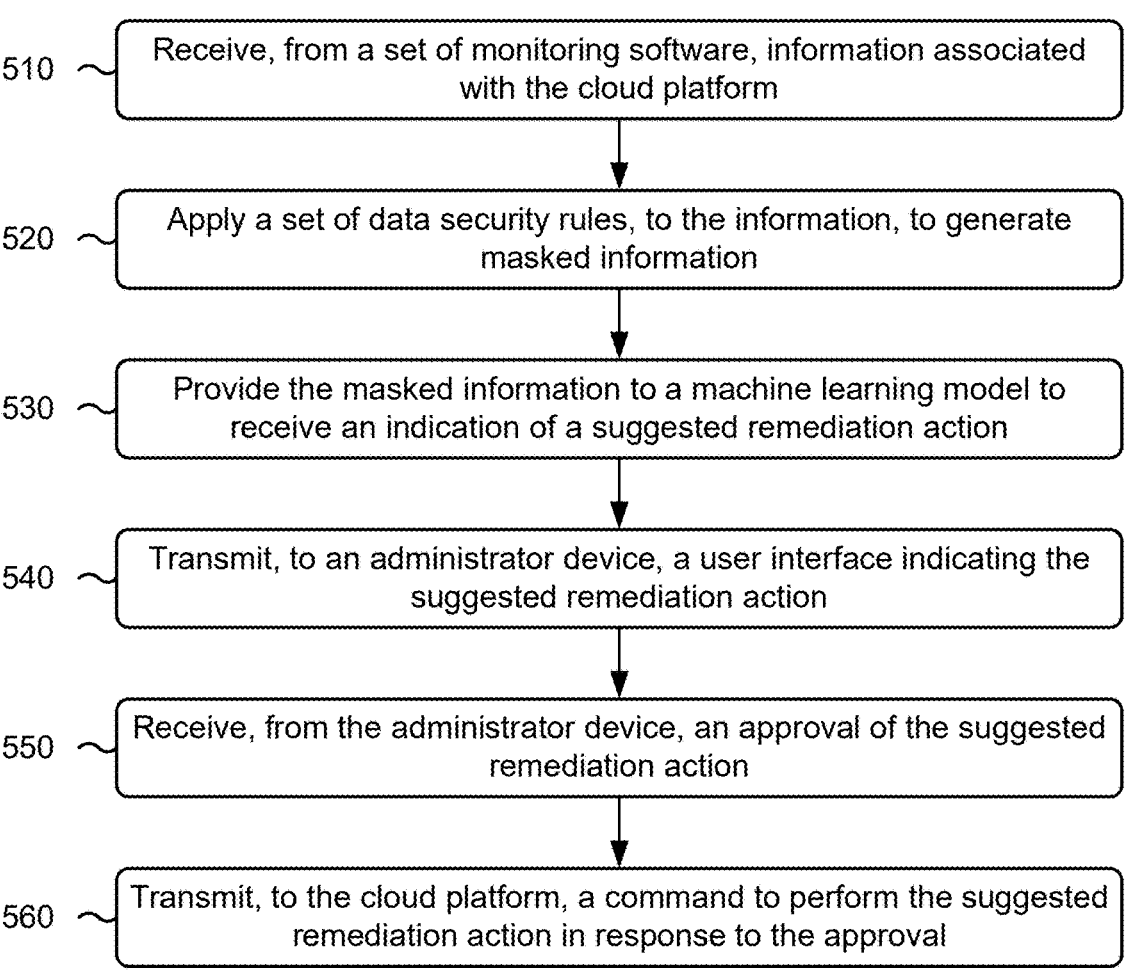

510 — Receive, from a set of monitoring software, information associated with the cloud platform 520 — Apply a set of data security rules, to the information, to generate masked information 530 — Provide the masked information to a machine learning model to receive an indication of a suggested remediation action 540 — Transmit, to an administrator device, a user interface indicating the suggested remediation action 550 — Receive, from the administrator device, an approval of the suggested remediation action 560 — Transmit, to the cloud platform, a command to perform the suggested remediation action in response to the approval

FIG. 5

AUTOMATED REMEDIATION OF CLOUD PLATFORM ERRORS

BACKGROUND

Cloud platforms may include a collection of cloud applications and cloud storages, among other examples. Problems in one aspect may further cause problems in other aspects. For example, an error with one cloud application in a cloud platform may lead to security vulnerabilities and also cause problems with related cloud applications in the cloud platform.

SUMMARY

Some implementations described herein relate to a system for automated remediation to increase resiliency of a cloud platform. The system may include one or more memories and one or more processors communicatively coupled to the one or more memories. The one or more processors may be configured to receive a set of log files associated with a cloud platform. The one or more processors may be configured to apply a set of data security rules to the set of log files to generate a masked set of log files. The one or more processors may be configured to transform the masked set of log files into a first set of matrices. The one or more processors may be configured to receive a set of incident notes associated with the cloud platform. The one or more processors may be configured to apply the set of data security rules to the set of incident notes to generate a masked set of incident notes. The one or more processors may be configured to transform the masked set of incident notes into a second set of matrices. The one or more processors may be configured to receive at least one voice recording associated with the cloud platform. The one or more processors may be configured to transform the at least one voice recording into a third set of matrices. The one or more processors may be configured to train a machine learning model using the first set of matrices, the second set of matrices, and the third set of matrices. The one or more processors may be configured to receive, from a set of monitoring software, information associated with the cloud platform. The one or more processors may be configured to apply the set of data security rules, to the information, to generate masked information. The one or more processors may be configured to provide the masked information to the machine learning model to receive a classification associated with the masked information and an indication of a suggested remediation action. The one or more processors may be configured to transmit, based on the classification being associated with an error, a command to the cloud platform to perform the suggested remediation action.

Some implementations described herein relate to a method of automated remediation to increase resiliency of a cloud platform. The method may include receiving, from a set of monitoring software and at a remediation system, information associated with the cloud platform. The method may include applying, by the remediation system, a set of data security rules to the information to generate masked information. The method may include providing, by the remediation system, the masked information to a machine learning model to receive a classification associated with the masked information and an indication of a suggested remediation action. The method may include determining, by the remediation system, that the classification is associated with an error. The method may include transmitting, from the remediation system and to the cloud platform, a command to perform the suggested remediation action based on determining that the classification is associated with the error.

Some implementations described herein relate to a non-transitory computer-readable medium that stores a set of instructions for generating remediation suggestions to increase resiliency of a cloud platform. The set of instructions, when executed by one or more processors of a device, may cause the device to receive, from a set of monitoring software, information associated with the cloud platform. The set of instructions, when executed by one or more processors of the device, may cause the device to apply a set of data security rules to the information to generate masked information. The set of instructions, when executed by one or more processors of the device, may cause the device to provide the masked information to a machine learning model to receive an indication of a suggested remediation action. The set of instructions, when executed by one or more processors of the device, may cause the device to transmit, to an administrator device, a user interface indicating the suggested remediation action. The set of instructions, when executed by one or more processors of the device, may cause the device to receive, from the administrator device, an approval of the suggested remediation action. The set of instructions, when executed by one or more processors of the device, may cause the device to transmit, to the cloud platform, a command to perform the suggested remediation action in response to the approval.

BRIEF DESCRIPTION OF THE DRAWINGS

FIGS. 4-5 are flowcharts of example processes relating to automated remediation of cloud platform errors, in accordance with some embodiments of the present disclosure.

DETAILED DESCRIPTION

The following detailed description of example implementations refers to the accompanying drawings. The same reference numbers in different drawings may identify the same or similar elements.

Cloud platforms may include a collection of cloud applications and cloud storages, among other examples. For example, a set of cloud applications in a cloud platform may support a plurality of clients (e.g., a web-based interface, a mobile application, or an application programming interface (API), among other examples). An error with one cloud application in the set may therefore result in downtime for one or more of the clients. Additionally, the error may cause problems with related cloud applications in the set.

Some implementations described herein enable automated remediation of errors in a cloud platform. For example, a machine learning model (or a suite of machine learning models) may identify an error and generate a suggested remediation action. As a result, downtime for clients of the cloud platform is reduced, security is improved, and the error is remediated sooner, in order to reduce possible problems for other portions of the cloud platform.

Furthermore, some implementations described herein enable using audio calls to train the machine learning model. For example, the audio calls may be transcribed and transformed into vectors for training the machine learning model. As a result, the machine learning model is more accurate, which improves suggested remediation actions from the machine learning model. Improved suggested remediation actions further reduce downtime, improve security, and reduce possible problems for other portions of the cloud platform. Additionally, or alternatively, some implementations described herein enable masking information used for training and applying the machine learning model. As a result, security is further improved because personally identifiable information (PII) is not provided to the model.

FIGS. 1A-1F are diagrams of an example 100 associated with automated remediation of cloud platform errors. As shown in FIGS. 1A-1F, example 100 includes a remediation system, a log repository, a ticket system, a video/audio call storage, a machine learning (ML) model (e.g., provided by an ML host), an administrator device, and a cloud platform. These devices are described in more detail in connection with FIGS. 2 and 3.

Figure 1A:
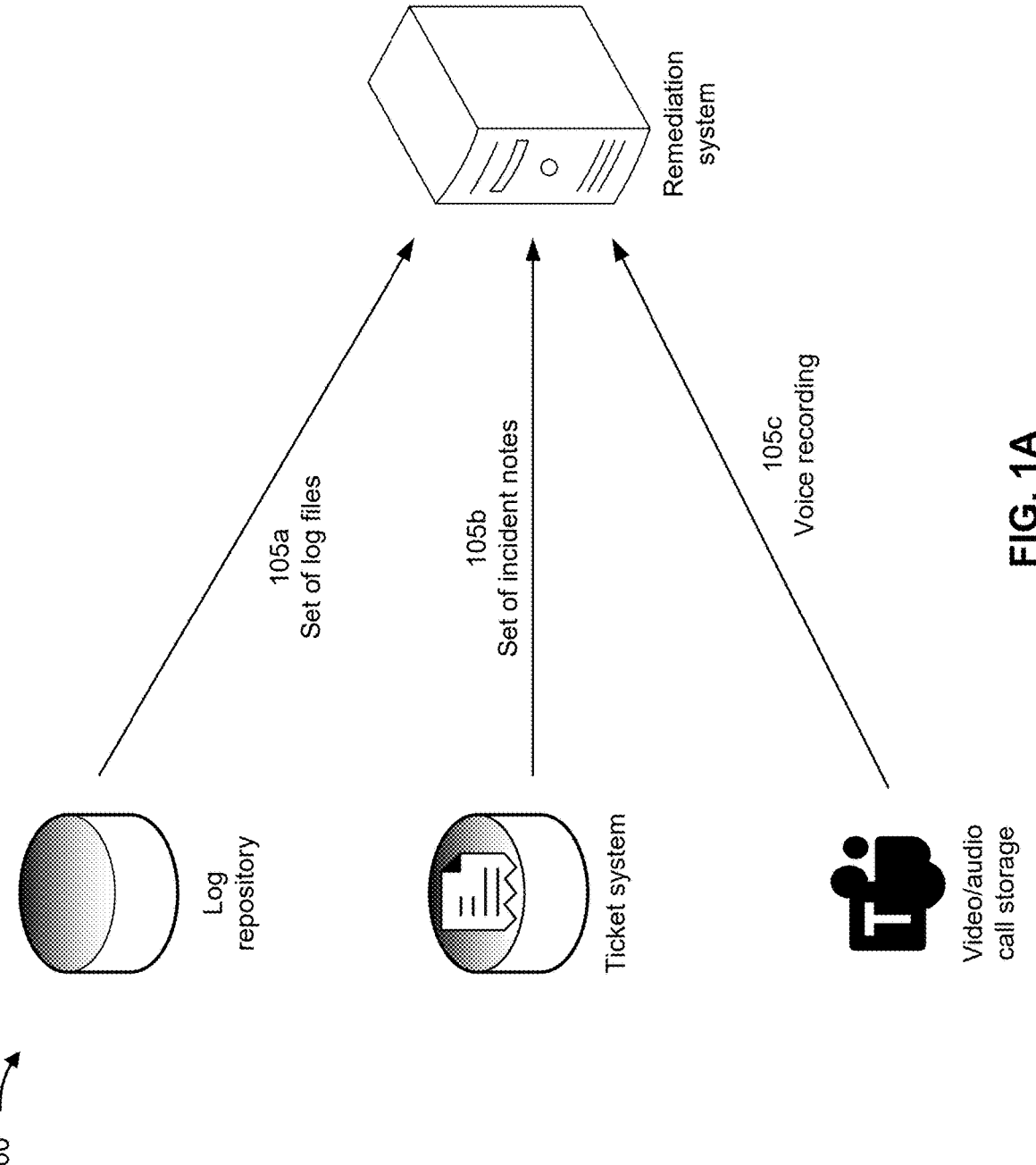
FIGS. 1A-1F are diagrams of an example implementation relating to automated remediation of cloud platform errors, in accordance with some embodiments of the present disclosure.

As shown in FIG. 1A and by reference number 105*a*, the log repository may transmit, and the remediation system may receive, a set of log files associated with the cloud platform. For example, the remediation system may transmit, and the log repository may receive, a request for the set of log files. The request may include a hypertext transfer protocol (HTTP) request, a file transfer protocol (FTP) request, and/or an API call, among other examples. The remediation system may include an indicator of the cloud platform (e.g., a name or another type of alphanumeric identifier) in the request (e.g., in a header of the request and/or as an argument). Accordingly, the log repository may transmit, and the remediation system may receive, the set of log files in response to the request. For example, the log repository may retrieve (e.g., from a local memory, such as a cache, and/or a remote storage) the set of log files based on the indicator of the cloud platform (e.g., by requesting all files including, or otherwise associated with, the indicator).

Additionally, or alternatively, the log repository may push the set of log files to the remediation system rather than the remediation system pulling the set of log files from the log repository. For example, the log repository may transmit periodically (e.g., according to a schedule, whether a default schedule or a schedule configured by the remediation system) and/or in real-time (or at least near-real-time) (e.g., transmitting new log files as available).

As described above, the cloud platform may include a set of cloud applications. The set of cloud applications may support a plurality of clients. For example, the plurality of clients may include a web-based interface, a mobile application, and/or an API, among other examples.

Additionally, or alternatively, as shown by reference number 105*b*, the ticket system may transmit, and the remediation system may receive, a set of incident notes associated with the cloud platform. In some implementations, the ticket system may transmit, and the remediation system may receive, a set of tickets, associated with cloud platform, that include (at least a portion of) the set of incident notes. For example, a ticket may include a "Comments" or a "Notes" section that includes a portion of the set of incident notes. Additionally, or alternatively, the ticket system may transmit, and the remediation system may receive, a set of chat logs, associated with the cloud platform, that include (at least a portion of) the set of incident notes. For example, a chat log may include comments between administrators (or other types of users), and a portion of the set of incident notes may be the comments.

In some implementations, the remediation system may transmit, and the ticket system may receive, a request for the set of incident notes. The request may include an HTTP request, an FTP request, and/or an API call, among other examples. The remediation system may include an indicator of the cloud platform (e.g., a name or another type of alphanumeric identifier) in the request (e.g., in a header of the request and/or as an argument). Accordingly, the ticket system may transmit, and the remediation system may receive, the set of incident notes in response to the request. For example, the ticket system may retrieve (e.g., from a local memory, such as a cache, and/or a remote storage) the set of incident notes based on the indicator of the cloud platform (e.g., by requesting all tickets and/or chat logs including, or otherwise associated with, the indicator).

Additionally, or alternatively, the ticket system may push the set of incident notes to the remediation system rather than the remediation system pulling the set of incident notes from the ticket system. For example, the ticket system may transmit periodically (e.g., according to a schedule, whether a default schedule or a schedule configured by the remediation system) and/or in real-time (or at least near-real-time) (e.g., transmitting new tickets and/or chat logs as available).

Additionally, or alternatively, as shown by reference number 105*c*, the video/audio call storage may transmit, and the remediation system may receive, a voice recording (e.g., at least one voice recording) associated with the cloud platform. In some implementations, the voice recording may be an audio file of a video conference or an audio track from a video file of a video conference. Additionally, or alternatively, the video/audio call storage may transmit, and the remediation system may receive, a video recording, and the remediation system may extract the voice recording from the video recording.

In some implementations, the remediation system may transmit, and the video/audio call storage may receive, a request for the voice recording. The request may include an HTTP request, an FTP request, and/or an API call, among other examples. The remediation system may include an indicator of the cloud platform (e.g., a name or another type of alphanumeric identifier) in the request (e.g., in a header of the request and/or as an argument). Accordingly, the video/audio call storage may transmit, and the remediation system may receive, the voice recording in response to the request. For example, the video/audio call storage may retrieve (e.g., from a local memory, such as a cache, and/or a remote storage) the voice recording based on the indicator of the cloud platform (e.g., by requesting all recordings including, or otherwise associated with, the indicator).

Additionally, or alternatively, the video/audio call storage may push the voice recording to the remediation system rather than the remediation system pulling the voice recording from the video/audio call storage. For example, the video/audio call storage may transmit periodically (e.g., according to a schedule, whether a default schedule or a schedule configured by the remediation system) and/or in real-time (or at least near-real-time) (e.g., transmitting new recordings as available).

Figure 1B:
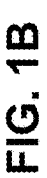
Figure 1B:
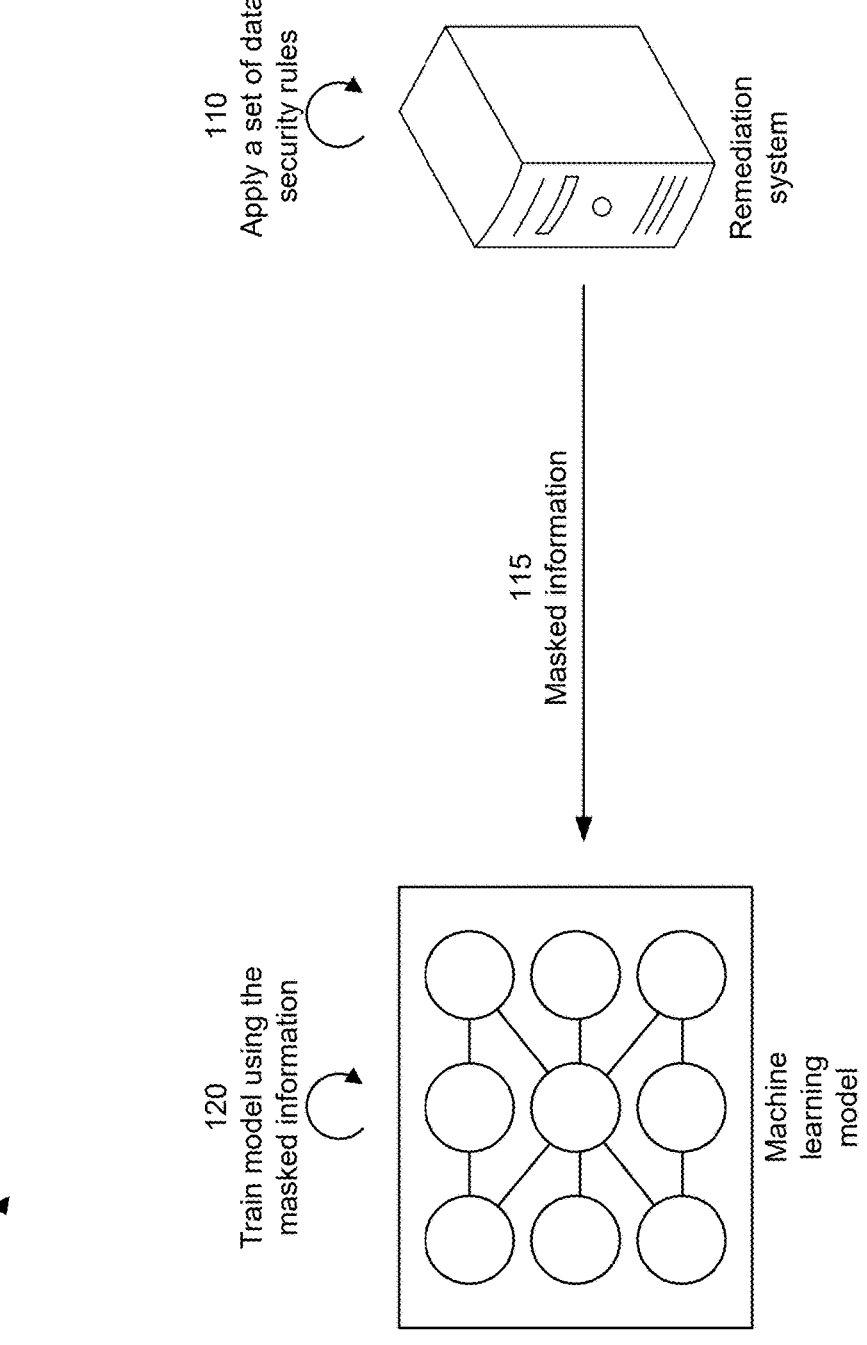

As shown in FIG. 1B and by reference number 110, the remediation system may apply a set of data security rules. The set of data security rules may include a plurality of patterns and a set of masking characters. For example, one pattern may be associated with social security numbers (SSNs) and may consist of three numbers, followed by two numbers, followed by four numbers (e.g., "###-##-####" or "#########" or "########"). In another example, one pattern may be associated with telephone numbers and may consist of three numbers followed by four numbers, optionally with three leading numbers for an area code (e.g., "###-####" or "###-###-####" or "(###) ###-####" or "#######"). In yet another example, one pattern may be associated with bank account numbers (BANs) and may consist of ten numbers or twelve numbers (e.g., "######" or "#######"). The masking characters may include asterisks, pound symbols, and/or letters (e.g., an 'x' or an 'X'), among other examples. Therefore, the remediation system may apply the set of data security rules by using the set of masking characters to replace characters that match one of the plurality of patterns.

In some implementations, the remediation system may apply the set of data security rules to the set of log files to generate a masked set of log files. For example, the masked set of log files may include the set of masking characters in place of any character strings that matched one of the plurality of patterns. The remediation system may replace the set of log files with the masked set of log files in order to improve security.

Additionally, or alternatively, the remediation system may apply the set of data security rules to the set of incident notes to generate a masked set of incident notes. For example, the masked set of incident notes may include the set of masking characters in place of any character strings that matched one of the plurality of patterns. The remediation system may replace the set of incident notes with the masked set of incident notes in order to improve security.

Additionally, or alternatively, the remediation system may apply the set of data security rules to the voice recording. For example, the remediation system may generate a transcript (e.g., at least one transcript) from the voice recording and apply the set of data security rules to the transcript. Therefore, the remediation system may generate a masked transcript that includes the set of masking characters in place of any character strings that matched one of the plurality of patterns. Additionally, or alternatively, the remediation system may obfuscate portions of the voice recording that map to time stamps in the transcript near character strings that matched one of the plurality of patterns. The remediation system may replace the voice recording with the masked voice recording (and/or the transcript with the masked transcript) in order to improve security.

As shown by reference number 115, the remediation system may provide the masked information associated with the cloud platform (e.g., the masked set of log files, the masked set of incident notes, and the masked transcript, as described above) for training the ML model. In some implementations, the remediation system may train the ML model directly. Alternatively, the remediation system may provide the masked information to the ML host such that the ML host may train the ML model, as described below.

As shown by reference number 120, the ML host may train the ML model using the masked information. For example, the ML host may transform the masked set of log files into a first set of matrices. The first set of matrices may be vectors (e.g., single-dimensional matrices) or larger (e.g., multi-dimensional matrices). The ML host may use an encoding space that converts features of the masked set of log files into numerical representations along one or more dimensions in order to derive the first set of matrices. The ML host may train the ML model using the first set of matrices.

In some implementations, the ML host may segment the masked set of log files by a set of time windows. Therefore, the first set of matrices may correspond to the set of time windows. For example, different dimensions of the first set of matrices may correspond to different time windows in the set of time windows. Additionally, or alternatively, different matrices in the first set of matrices may correspond to different time windows in the set of time windows. Although the example 100 is described in connection with the ML host segmenting the set of masked log files, other examples may include the remediation system segmenting the masked set of log files. Therefore, the remediation system may transmit an indication of segments to the ML host. In some implementations, the remediation system may segment the set of log files prior to applying the set of data security rules. Therefore, the masked set of log files may be segmented by virtue of the set of log files being segmented prior to masking.

Additionally, the ML host may transform the masked set of incident notes into a second set of matrices. The second set of matrices may be vectors (e.g., single-dimensional matrices) or larger (e.g., multi-dimensional matrices). The ML host may use an encoding space that converts features of the masked set of incident notes into numerical representations along one or more dimensions in order to derive the second set of matrices. Therefore, the ML host may train the ML model using the second set of matrices.

Additionally, the ML host may transform the masked voice recording (and/or the masked transcript) into a third set of matrices. The third set of matrices may be vectors (e.g., single-dimensional matrices) or larger (e.g., multi-dimensional matrices). The ML host may use an encoding space that converts features of the voice recording (and/or the masked transcript) into numerical representations along one or more dimensions in order to derive the third set of matrices. Therefore, the ML host may train the ML model using the third set of matrices.

By using the voice recording to train the ML model in addition to the set of log files and the set of incident notes, the ML host may improve accuracy of the ML model. For example, the ML model may more accurately generate suggested remediation actions (e.g., as described below) based on the voice recording. More accurate suggestions result in faster remediation, and because remediation is faster, downtime for the cloud platform is reduced, security for the cloud platform is improved, and possible problems for other portions of the cloud platform are reduced.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., information about front-end devices). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the ML host, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 1C:
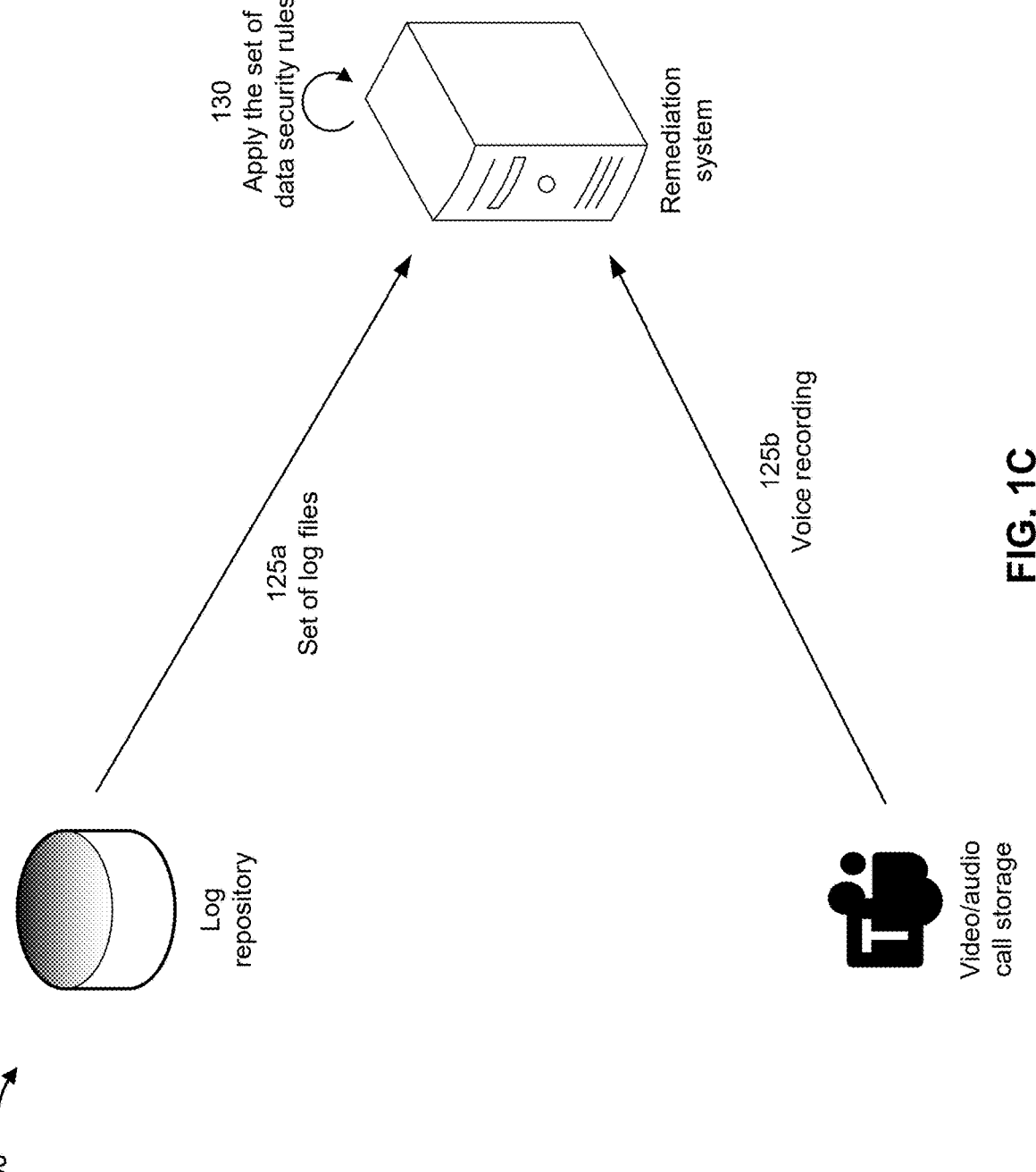

As shown in FIG. 1C, the remediation system may receive information associated with the cloud platform. For example, a set of monitoring software may monitor the cloud platform and generate the information.

In some implementations, the set of monitoring software may generate log files and transmit the log files for storage in the log repository. Accordingly, as shown by reference number 125a, the log repository may transmit, and the remediation system may receive, a set of log files associated with the cloud platform. The set of log files received as shown in FIG. 1C may be associated with a later window in time than the set of log files received as shown in FIG. 1A. In other words, an earlier set of log files may be used to train the ML model, and a later set of log files may be used to apply the ML model to detect errors (if any) with the cloud platform.

In some implementations, the remediation system may transmit, and the log repository may receive, a request for the set of log files. The request may include an HTTP request, an FTP request, and/or an API call, among other examples. The remediation system may include an indicator of the cloud platform (e.g., a name or another type of alphanumeric identifier) in the request (e.g., in a header of the request and/or as an argument). Accordingly, the log repository may transmit, and the remediation system may receive, the set of log files in response to the request. For example, the log repository may retrieve (e.g., from a local memory, such as a cache, and/or a remote storage) the set of log files based on the indicator of the cloud platform (e.g., by requesting all files including, or otherwise associated with, the indicator).

Additionally, or alternatively, the log repository may push the set of log files to the remediation system rather than the remediation system pulling the set of log files from the log repository. For example, the log repository may transmit periodically (e.g., according to a schedule, whether a default schedule or a schedule configured by the remediation system) and/or in real-time (or at least near-real-time) (e.g., transmitting new log files as received from the set of monitoring software).

Additionally, or alternatively, as shown by reference number 125b, the video/audio call storage may transmit, and the remediation system may receive, a voice recording (e.g., at least one voice recording) associated with the cloud platform. For example, administrators (or other types of users) may record a video conference that was related to the cloud platform, and a platform that hosted the video conference (e.g., a Zoom® platform, a Microsoft Teams® platform, or a Google Meet® platform, among other examples) may transmit the recording for storage in the video/audio call storage. The voice recording received as shown in FIG. 1C may be associated with a later window in time than the voice recording received as shown in FIG. 1A. In other words, an earlier voice recording may be used to train the ML model, and a later voice recording may be used to apply the ML model to detect errors (if any) with the cloud platform.

In some implementations, the remediation system may transmit, and the video/audio call storage may receive, a request for the voice recording. The request may include an HTTP request, an FTP request, and/or an API call, among other examples. The remediation system may include an indicator of the cloud platform (e.g., a name or another type of alphanumeric identifier) in the request (e.g., in a header of the request and/or as an argument). Accordingly, the video/audio call storage may transmit, and the remediation system may receive, the voice recording in response to the request. For example, the video/audio call storage may retrieve (e.g., from a local memory, such as a cache, and/or a remote storage) the voice recording based on the indicator of the cloud platform (e.g., by requesting all files including, or otherwise associated with, the indicator).

As shown by reference number 130, the remediation system may apply the set of data security rules. For example, the remediation system may mask a sensitive field (e.g., at least one sensitive field) in the information associated with the cloud platform. Therefore, the information associated with the cloud platform may be replaced by masked information with the cloud platform.

In some implementations, the remediation system may apply the set of data security rules to the set of log files to generate a masked set of log files. For example, the masked set of log files may include the set of masking characters in place of any character strings that matched one of the plurality of patterns. The remediation system may replace the set of log files with the masked set of log files in order to improve security.

Additionally, or alternatively, the remediation system may apply the set of data security rules to the voice recording. For example, the remediation system may generate a transcript (e.g., at least one transcript) from the voice recording and apply the set of data security rules to the transcript. Therefore, the remediation system may generate a masked transcript that includes the set of masking characters in place of any character strings that matched one of the plurality of patterns. Additionally, or alternatively, the remediation system may obfuscate portions of the voice recording that map to time stamps in the transcript near character strings that matched one of the plurality of patterns. The remediation system may replace the voice recording with the masked voice recording (and/or the transcript with the masked transcript) in order to improve security.

Figure 1D:
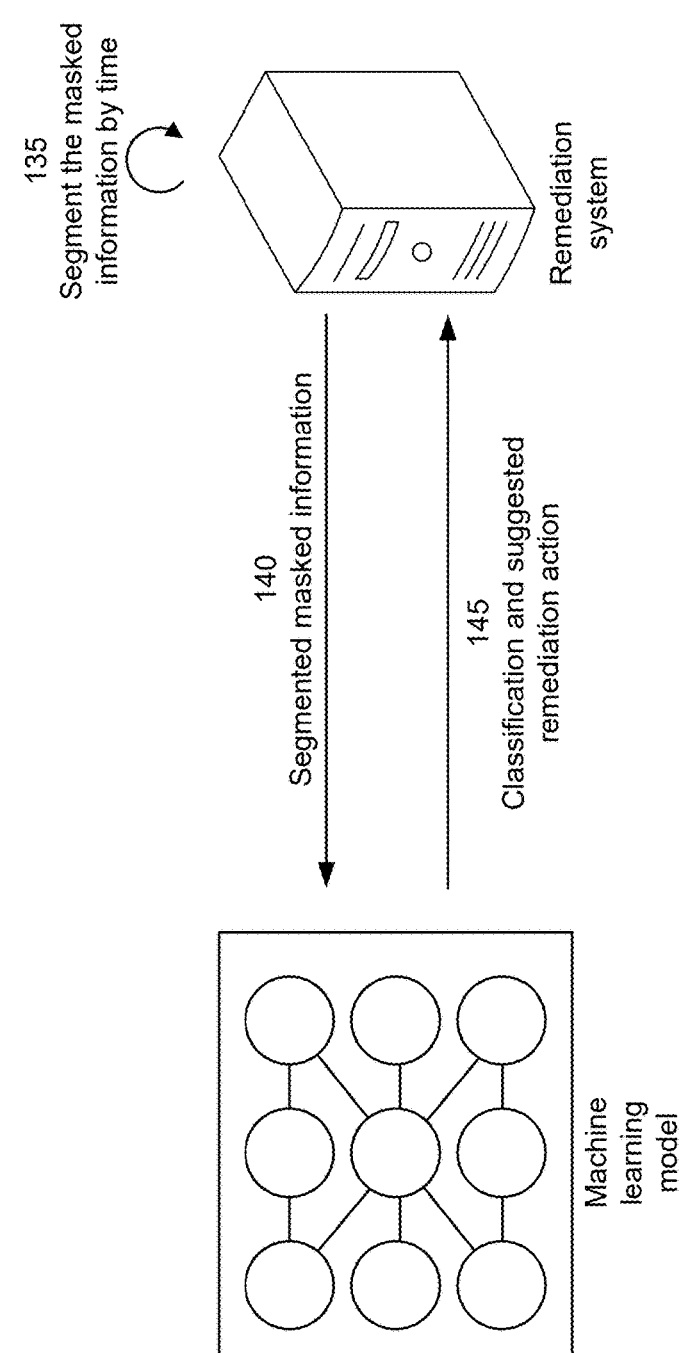

As shown in FIG. 1D and by reference number 135, the remediation system may segment the masked information associated with the cloud platform by a set of time windows. For example, the remediation system may segment masked set of log files by the set of time windows. Although the example 100 is described in connection with the remediation system segmenting the masked information, other examples may include the remediation system segmenting the information prior to applying the set of data security rules. Therefore, the masked information may be segmented by virtue of the information being segmented prior to masking.

As shown by reference number 140, the remediation system may provide the masked information to the ML model. For example, the remediation system may transmit, and the ML host (associated with the ML model) may receive, a request including the masked information.

The ML model may be trained (e.g., as described above by the ML host and/or a device at least partially separate from the ML host) using log files, incident notes, and/or voice recordings. The log files, incident notes, and/or voice recordings may be labeled by administrators or other types of users (e.g., for supervised learning). Additionally, or alternatively, the log files, incident notes, and/or voice recordings may be unlabeled (e.g., for deep learning). The ML model may be configured to determine whether the cloud platform is experiencing an error (e.g., based on the masked information input by the remediation system). Additionally, or alternatively, the ML model may be configured to determine a probability that a particular error is present (e.g., based on the masked information input by the remediation system). Accordingly, the error may be detected as present (or not) based on whether the probability satisfies an error threshold.

In some implementations, the ML model may be additionally configured to determine a suggested remediation action for the error. For example, the ML model may output an indication of the suggested remediation action. Additionally, or alternatively, the ML model may be configured to score each remediation action in a set of possible remediation actions (e.g., based on the masked information input by the remediation system). Accordingly, the suggested remediation action may be selected based on the score for the suggested remediation action satisfying a selection threshold.

Although the example 100 describes the ML model as a single model, other examples may include a suite of models. For example, a first ML model may be configured to determine whether the cloud platform is experiencing an error, and a second ML model may be configured to determine the suggested remediation action for the error. Accordingly, output from the first ML model may serve as input to the second ML model.

As shown by reference number 145, the remediation system may receive a classification from the ML model (e.g., from the ML host). The classification may be associated with the masked information (input to the ML model by the remediation system). The remediation system may determine that the classification is associated with an error. In some implementations, the classification may explicitly indicate the error. For example, the classification may include a binary classification indicating whether the error is present. Additionally, or alternatively, the classification may include a multi-class classification indicating a type of the error. Alternatively, the classification may implicitly indicate the error. For example, the classification may include a score (or a plurality of scores), and the remediation system may determine that an error is present based on the score failing to satisfy a health threshold. In some implementations, the remediation system may determine the type of the error based on which score, in the plurality of scores, fails to satisfy the health threshold.

As further shown by reference number 145, the remediation system may receive an indication of a suggested remediation action from the ML model (e.g., from the ML host). For example, the ML model may transmit a set of human-readable instructions for remediating the error. Additionally, or alternatively, the ML model may transmit a set of machine-interpretable instructions for remediating the error. For example, the ML model may transmit a script (e.g., a set of Bourne Again Shell (BASH) instructions, a set of Python instructions, and/or another set of sequential instructions for execution) that the cloud platform may execute to remediate the error.

Figure 1E:
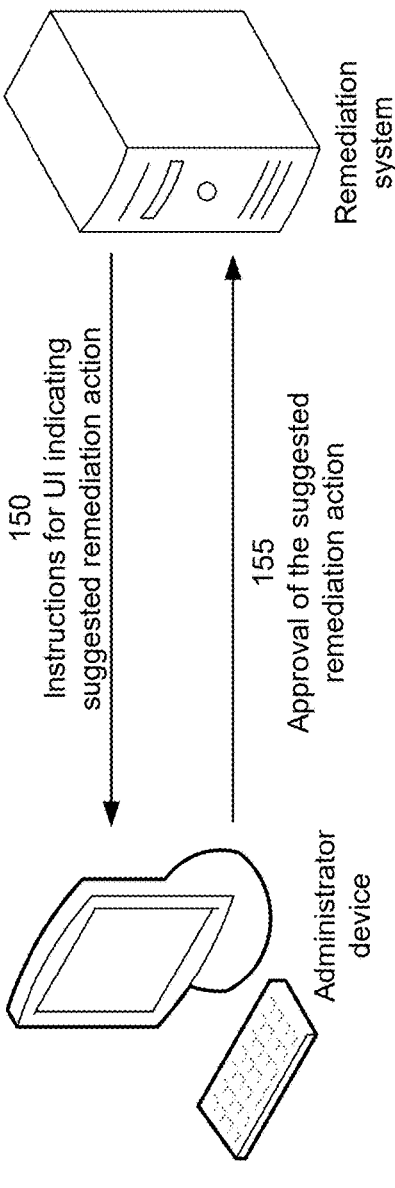
Figure 1E:
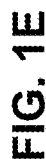

As shown in FIG. 1E and by reference number 150, the remediation system may transmit, and the administrator device may receive, instructions for a user interface (UI) that indicates the suggested remediation action. For example, the UI may include a box (or another pixel space) with human-readable instructions from the ML model. Additionally, or alternatively, the UI may include a filepath for the script from the ML model (or another type of indication of the script). In some implementations, the UI may indicate the classification from the ML model (e.g., the binary classification, the multi-class classification, and/or the plurality of scores, as described above).

As shown by reference number 155, the administrator device may transmit, and the remediation system may receive, an approval of the suggested remediation action. For example, an administrator using the administrator device may interact with the UI from the remediation system (e.g., and output via an output component of the administrator device). The interaction may trigger the administrator device to transmit the approval. Accordingly, in some implementations, the administrator device may transmit, and the remediation system may receive, an indication of the interaction with the UI, and the indication of the interaction may function as the approval.

Figure 1F:
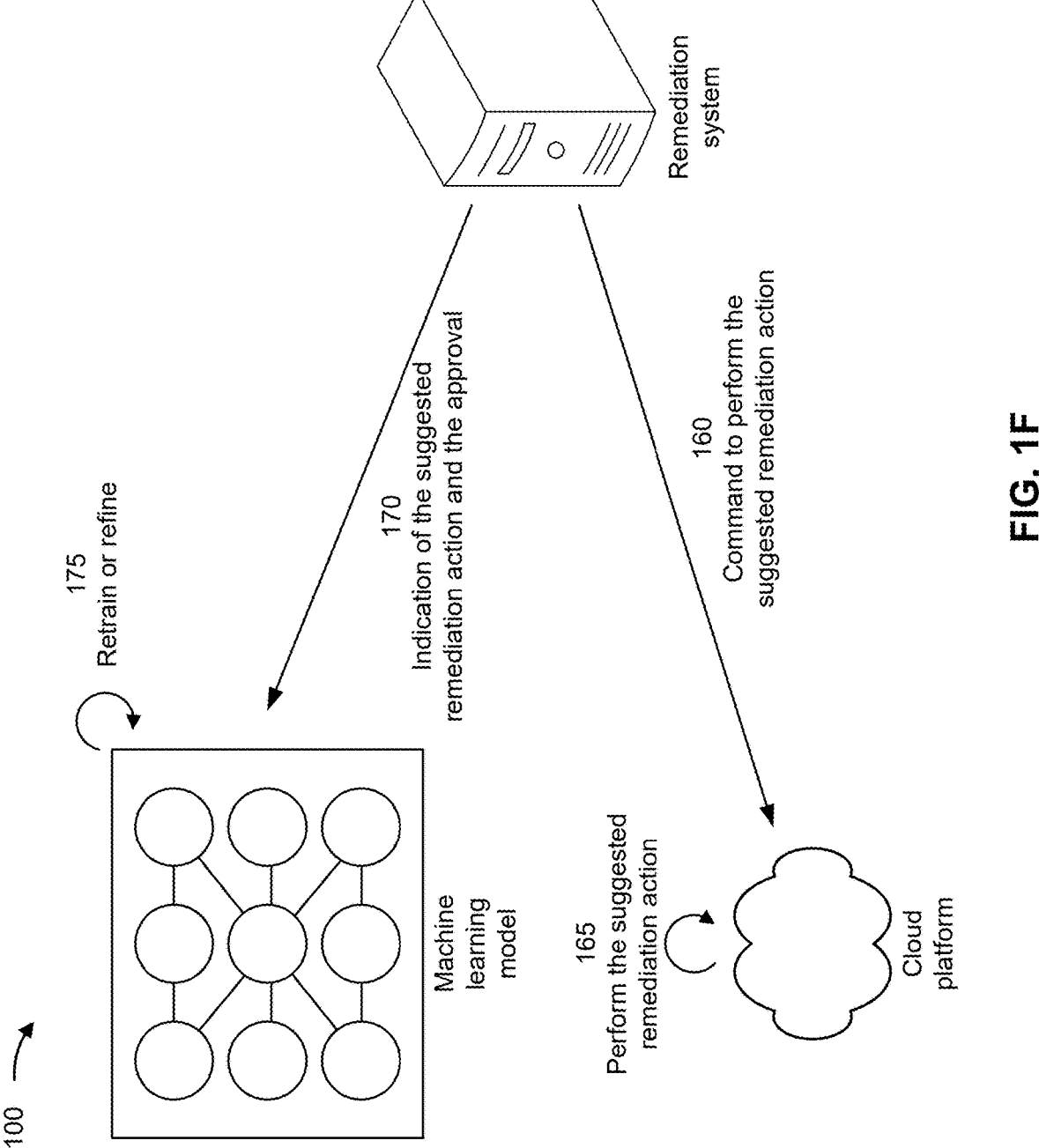

As shown in FIG. 1F and by reference number 160, the remediation system may transmit, and the cloud platform may receive, a command to perform the suggested remediation action. The remediation system may transmit, and the cloud platform may receive, the command in response to the approval (from the administrator device). Other examples may include the remediation system automatically transmitting the command. For example, the remediation system may transmit, and the cloud platform may receive, the command based on a determination (e.g., by the remediation system) that the classification (from the ML model) is associated with the error. As shown by reference number 165, the cloud platform may execute the command to perform the suggested remediation action.

In some implementations, the command may be a single instruction. For example, the command may include a command to restart a cloud application, update a cloud application, reroute API calls, and/or initiate new API instances, among other examples. Alternatively, the command may be a series of instructions. For example, the command may be a command to execute a script generated by the ML model, as described above.

Additionally, in some implementations and as shown by reference number 170, the remediation system may provide the suggested remediation action and the approval to the ML model (e.g., for retraining or refinement). For example, the remediation system may transmit, and the ML host (associated with the ML model) may receive, a message including the suggested remediation action and the approval. As shown by reference number 175, the ML host may retrain or refine the ML model using the suggested remediation action and the approval. For example, the suggested remediation action and the approval may be added to a training data set, and the ML model may be retrained on the updated training data set. Additionally, or alternatively, the suggested remediation action and the approval may be used to refine the ML model by modifying a portion of the ML model (e.g., adjusting activation weights in a neural network, among other examples).

By using techniques as described in connection with FIGS. 1A-1F, the ML model may classify the error and generate the suggested remediation action. As a result, downtime for the plurality of clients of the cloud platform is reduced, security is improved, and the error is remediated sooner in order to reduce possible problems for other portions of the cloud platform. Furthermore, voice recordings are used in training and applying the ML model. As a result, the ML model is more accurate, which improves suggested remediation actions from the ML model. Improved suggested remediation actions further reduce downtime, improve security, and reduce possible problems for other portions of the cloud platform. Additionally, information associated with the cloud platform is masked before being used for training and applying the ML model. As a result, security is further improved because PII is not provided to the ML model.

As indicated above, FIGS. 1A-1F are provided as an example. Other examples may differ from what is described with regard to FIGS. 1A-1F.

Figure 2:
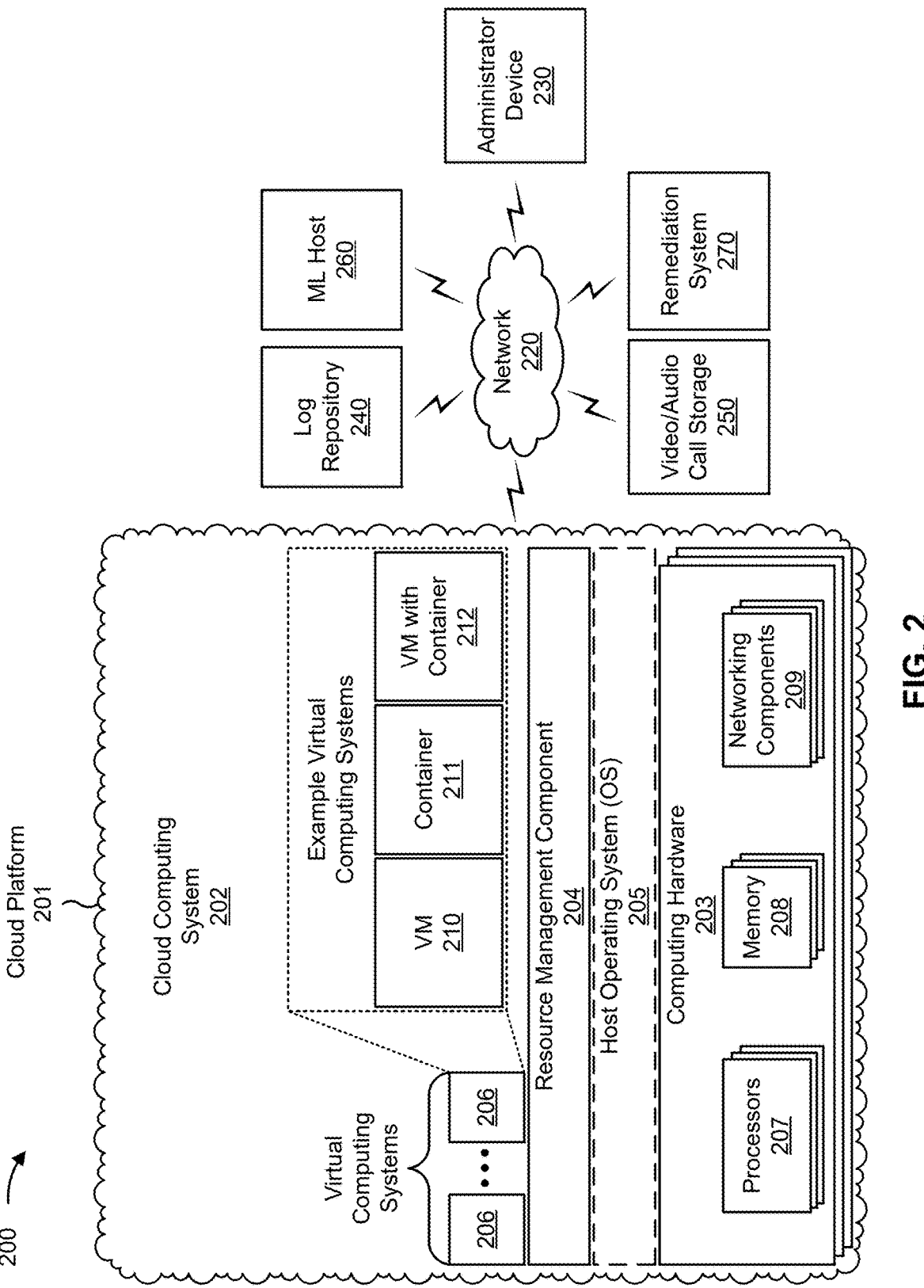
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a cloud platform 201, which may include one or more elements of and/or may execute within a cloud computing system 202. The cloud computing system 202 may include one or more elements 203-212, as described in more detail below. As further shown in FIG. 2, environment 200 may include a network 220, an administrator device 230, a log repository 240, a video/audio call storage 250, an ML host 260, and/or a remediation system 270. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the cloud platform 201 may include one or more elements 203-212 of the cloud computing system 202, may execute within the cloud computing system 202, and/or may be hosted within the cloud computing system 202, in some implementations, the cloud platform 201 may not be cloud-based (e.g., may be implemented outside of a cloud computing system) or may be partially cloud-based. For example, the cloud platform 201 may include one or more devices that are not part of the cloud computing system 202, such as device 300 of FIG. 3, which may include a standalone server or another type of computing device. The cloud platform 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The administrator device 230 may include one or more devices capable of receiving, generating, storing, processing, and/or providing information associated with cloud platform classifications (and suggested remediation actions), as described elsewhere herein. The administrator device 230 may include a communication device and/or a computing device. For example, the administrator device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 230 may communicate with one or more other devices of environment 200, as described elsewhere herein.

The log repository 240 may include one or more devices capable of receiving, generating, storing, processing, and/or providing information associated with log files, as described elsewhere herein. The log repository 240 may include a communication device and/or a computing device. For example, the log repository 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the log repository 240 may be associated with a set of monitoring software and/or a cloud storage system (e.g., Google® Drive, Microsoft OneDrive® and/or Dropbox®, among other examples). The log repository 240 may communicate with one or more other devices of environment 200, as described elsewhere herein.

The video/audio call storage 250 may include one or more devices capable of receiving, generating, storing, processing, and/or providing information associated with recordings, as described elsewhere herein. The video/audio call storage 250 may include a communication device and/or a computing device. For example, the video/audio call storage 250 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the video/audio call storage 250 may be associated with a conferencing platform (e.g., a Zoom platform, a Microsoft Teams platform, and/or a Google Meet platform, among other examples). The video/audio call storage 250 may communicate with one or more other devices of environment 200, as described elsewhere herein.

The ML host 260 may include one or more devices capable of receiving, generating, storing, processing, and/or providing information associated with machine learning models, as described elsewhere herein. The ML host 260 may include a communication device and/or a computing device. For example, the ML host 260 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 260 may communicate with one or more other devices of environment 200, as described elsewhere herein.

The remediation system 270 may include one or more devices capable of performing one or more operations and/or processes described in more detail elsewhere herein. The remediation system 270 may include a communication device and/or a computing device. For example, the remediation system 270 may include a server, such as an application server, a client server, a web server, a database server, a host server, a proxy server, a virtual server (e.g., executing on computing hardware), or a server in a cloud computing system. In some implementations, the remediation system 270 may include computing hardware used in a cloud computing environment. The remediation system 270 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
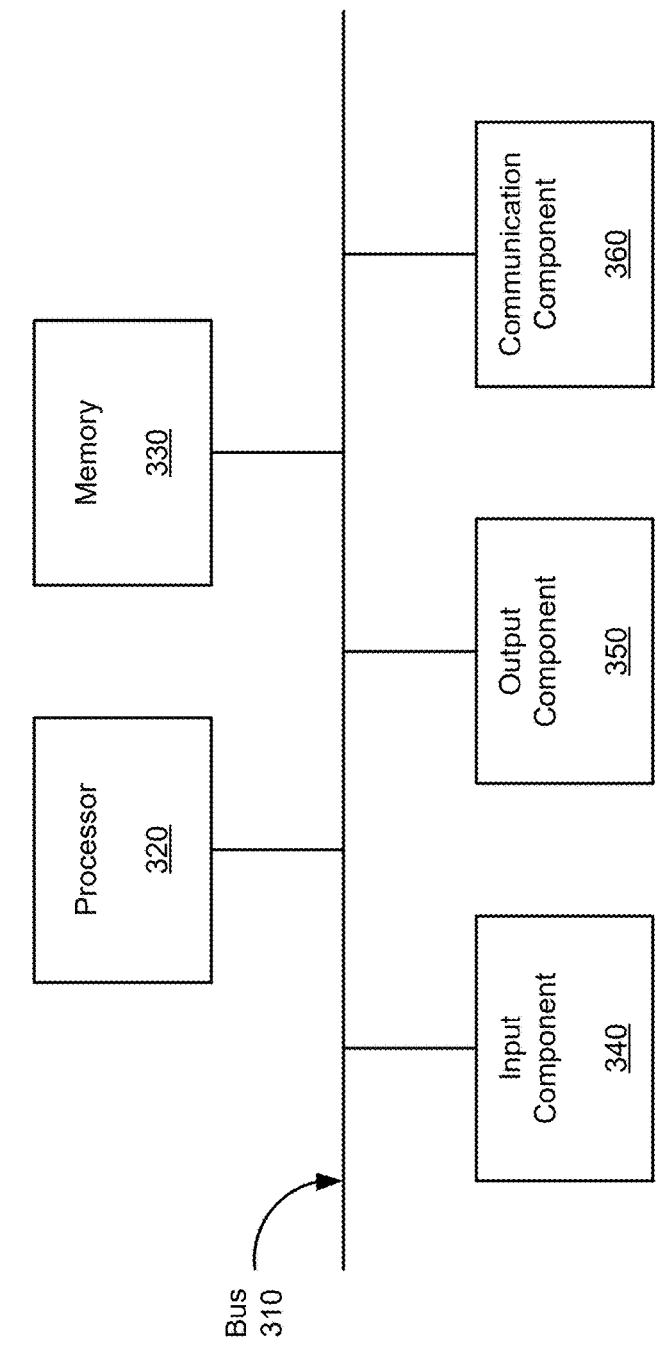
FIG. 3 is a diagram of example components of one or more devices of FIG. 2, in accordance with some embodiments of the present disclosure.

FIG. 3 is a diagram of example components of a device 300 associated with automated remediation of cloud platform errors. The device 300 may correspond to an administrator device 230, a log repository 240, a video/audio call storage 250, an ML host 260, and/or a remediation system 270. In some implementations, an administrator device 230, a log repository 240, a video/audio call storage 250, an ML host 260, and/or a remediation system 270 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with automated remediation of cloud platform errors. In some implementations, one or more process blocks of FIG. 4 may be performed by a remediation system 270. In some implementations, one or more process blocks of FIG. 4 may be performed by another device or a group of devices separate from or including the remediation system 270, such as a cloud platform 201, an administrator device 230, a log repository 240, a video/audio call storage 250, and/or an ML host 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a set of log files associated with a cloud platform (block 405). For example, the remediation system 270 (e.g., using processor 320, memory 330, input component 340, and/or communication component 360) may receive a set of log files associated with a cloud platform, as described above in connection with reference number 105a of FIG. 2A. As an example, the remediation system 270 may transmit a request for the set of log files to a log repository and may receive the set of log files from the log repository in response to the request.

As further shown in FIG. 4, process 400 may include applying a set of data security rules to the set of log files to generate a masked set of log files (block 410). For example, the remediation system 270 (e.g., using processor 320 and/or memory 330) may apply a set of data security rules to the set of log files to generate a masked set of log files, as described above in connection with reference number 110 of FIG. 1B. As an example, the remediation system 270 may apply the set of data security rules by using a set of masking characters, in the set of data security rules, to replace characters in the set of log files that match one of a plurality of patterns in the set of data security rules.

As further shown in FIG. 4, process 400 may include transforming the masked set of log files into a first set of matrices (block 415). For example, the remediation system 270 (e.g., using processor 320 and/or memory 330) may transform the masked set of log files into a first set of matrices, as described above in connection with reference number 120 of FIG. 1B. As an example, the remediation system 270 may use an encoding space that converts features of the masked set of log files into numerical representations along one or more dimensions in order to derive the first set of matrices.

As further shown in FIG. 4, process 400 may include receiving a set of incident notes associated with the cloud platform (block 420). For example, the remediation system 270 (e.g., using processor 320, memory 330, input component 340, and/or communication component 360) may receive a set of incident notes associated with the cloud platform, as described above in connection with reference number 105b of FIG. 1B. As an example, the remediation system 270 may receive a set of tickets, associated with cloud platform, that include (at least a portion of) the set of incident notes. Additionally, or alternatively, the remediation system 270 may receive a set of chat logs, associated with the cloud platform, that include (at least a portion of) the set of incident notes.

As further shown in FIG. 4, process 400 may include applying the set of data security rules to the set of incident notes to generate a masked set of incident notes (block 425). For example, the remediation system 270 (e.g., using processor 320 and/or memory 330) may apply the set of data security rules to the set of incident notes to generate a masked set of incident notes, as described above in connection with reference number 110 of FIG. 1B. As an example, the remediation system 270 may apply the set of data security rules by using a set of masking characters, in the set of data security rules, to replace characters in the set of incident notes that match one of a plurality of patterns in the set of data security rules.

As further shown in FIG. 4, process 400 may include transforming the masked set of incident notes into a second set of matrices (block 430). For example, the remediation system 270 (e.g., using processor 320 and/or memory 330) may transform the masked set of incident notes into a second set of matrices, as described above in connection with reference number 120 of FIG. 1B. As an example, the remediation system 270 may use an encoding space that converts features of the masked set of incident notes into numerical representations along one or more dimensions in order to derive the second set of matrices.

As further shown in FIG. 4, process 400 may include receiving at least one voice recording associated with the cloud platform (block 435). For example, the remediation system 270 (e.g., using processor 320, memory 330, input component 340, and/or communication component 360) may receive at least one voice recording associated with the cloud platform, as described above in connection with reference number 105c of FIG. 1A. As an example, the remediation system 270 may transmit a request for the at least one voice recording to a video/audio call storage and may receive the at least one voice recording from the video/audio call storage in response to the request.

As further shown in FIG. 4, process 400 may include transforming the at least one voice recording into a third set of matrices (block 440). For example, the remediation system 270 (e.g., using processor 320 and/or memory 330) may transform the at least one voice recording into a third set of matrices, as described above in connection with reference number 120 of FIG. 1B. As an example, the remediation system 270 may generate at least one transcript from the at least one voice recording. Therefore, the remediation system may use an encoding space that converts features of the at least one transcript into numerical representations along one or more dimensions in order to derive the third set of matrices.

As further shown in FIG. 4, process 400 may include training a machine learning model using the first set of matrices, the second set of matrices, and the third set of matrices (block 445). For example, the remediation system 270 (e.g., using processor 320, memory 330, and/or communication component 360) may train a machine learning model using the first set of matrices, the second set of matrices, and the third set of matrices, as described above in connection with reference number 120 of FIG. 1B. As an example, the remediation system 270 may train the machine learning model directly and/or may instruct an ML host to train the machine learning model.

As further shown in FIG. 4, process 400 may include receiving, from a set of monitoring software, information associated with the cloud platform (block 450). For example, the remediation system 270 (e.g., using processor 320, memory 330, and/or communication component 360) may receive, from a set of monitoring software, information associated with the cloud platform, as described above in connection with FIG. 1C. As an example, the remediation system 270 may receive a set of log files and/or at least one voice recording associated with the cloud platform.

As further shown in FIG. 4, process 400 may include applying the set of data security rules, to the information, to generate masked information (block 455). For example, the remediation system 270 (e.g., using processor 320 and/or memory 330) may apply the set of data security rules, to the information, to generate masked information, as described above in connection with reference number 130 of FIG. 1C. As an example, the remediation system 270 may mask at least one sensitive field in the information associated with the cloud platform.

As further shown in FIG. 4, process 400 may include providing the masked information to the machine learning model to receive a classification associated with the masked information and an indication of a suggested remediation action (block 460). For example, the remediation system 270 (e.g., using processor 320, memory 330, and/or communication component 360) may provide the masked information to the machine learning model to receive a classification associated with the masked information and an indication of a suggested remediation action, as described above in connection with reference numbers 140 and 145 of FIG. 1D. As an example, the classification may include a binary classification indicating whether an error is present or a multi-class classification indicating a type of the error. The suggested remediation action may include a set of human-readable instructions for remediating the error and/or a set of machine-interpretable instructions (e.g., a script) for remediating the error.

As further shown in FIG. 4, process 400 may include transmitting, based on the classification being associated with an error, a command to the cloud platform to perform the suggested remediation action (block 465). For example, the remediation system 270 (e.g., using processor 320, memory 330, and/or communication component 360) may transmit, based on the classification being associated with an error, a command to the cloud platform to perform the suggested remediation action, as described above in connection with reference number 160 of FIG. 1F. As an example, the command may be a single instruction or may be a command to execute a script.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

FIG. 5 is a flowchart of an example process 500 associated with automated remediation of cloud platform errors. In some implementations, one or more process blocks of FIG. 5 may be performed by the remediation system 270. In some implementations, one or more process blocks of FIG. 5 may be performed by another device or a group of devices separate from or including the remediation system 270, such as a cloud platform 201, an administrator device 230, a log repository 240, a video/audio call storage 250, and/or an ML host 260. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include receiving, from a set of monitoring software, information associated with the cloud platform (block 510). For example, the remediation system 270 (e.g., using processor 320, memory 330, and/or communication component 360) may receive, from a set of monitoring software, information associated with the cloud platform, as described above in connection with FIG. 1C. As an example, the remediation system 270 may receive a set of log files and/or at least one voice recording associated with the cloud platform.

As further shown in FIG. 5, process 500 may include applying a set of data security rules to the information to generate masked information (block 520). For example, the remediation system 270 (e.g., using processor 320 and/or memory 330) may apply a set of data security rules to the information to generate masked information, as described above in connection with reference number 130 of FIG. 1C. As an example, the remediation system 270 may mask at least one sensitive field in the information associated with the cloud platform.

As further shown in FIG. 5, process 500 may include providing the masked information to a machine learning model to receive an indication of a suggested remediation action (block 530). For example, the remediation system 270 (e.g., using processor 320, memory 330, and/or communication component 360) may provide the masked information to a machine learning model to receive an indication of a suggested remediation action, as described above in connection with reference numbers 140 and 145 of FIG. 1D. The suggested remediation action may include a set of human-readable instructions for remediating the error and/or a set of machine-interpretable instructions (e.g., a script) for remediating the error.

As further shown in FIG. 5, process 500 may include transmitting, to an administrator device, a user interface indicating the suggested remediation action (block 540). For example, the remediation system 270 (e.g., using processor 320, memory 330, and/or communication component 360) may transmit, to an administrator device, a user interface indicating the suggested remediation action, as described above in connection with reference number 150 of FIG. 1E. As an example, the UI may include a box (or another pixel space) with human-readable instructions from the machine learning model. Additionally, or alternatively, the UI may include a filepath for a script from the machine learning model (or another type of indication of the script). In some implementations, the UI may indicate a classification from the ML model.

As further shown in FIG. 5, process 500 may include receiving, from the administrator device, an approval of the suggested remediation action (block 550). For example, the remediation system 270 (e.g., using processor 320, memory 330, and/or communication component 360) may receive, from the administrator device, an approval of the suggested remediation action, as described above in connection with reference number 155 of FIG. 1E. As an example, the remediation system 270 may receive an indication of an interaction with the user interface, and the indication of the interaction may function as the approval.

As further shown in FIG. 5, process 500 may include transmitting, to the cloud platform, a command to perform the suggested remediation action in response to the approval (block 560). For example, the remediation system 270 (e.g., using processor 320, memory 330, and/or communication component 360) may transmit, to the cloud platform, a command to perform the suggested remediation action in response to the approval, as described above in connection with reference number 160 of FIG. 1F. As an example, the command may be a single instruction or may be a command to execute a script.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automated remediation to increase resiliency of a cloud platform, the system comprising:
   one or more memories; and
   one or more processors, communicatively coupled to the one or more memories, configured to:
   receive, from a set of monitoring software, information associated with the cloud platform;
   apply a set of data security rules, to the information, to generate masked information;
   provide the masked information to a machine learning model to receive a classification associated with the masked information and an indication of a suggested remediation action; and
   transmit, based on the classification being associated with an error, a command to the cloud platform to perform the suggested remediation action.

2. The system of claim 1, wherein the one or more processors are configured to:
   receive a set of log files associated with the cloud platform;
   apply the set of data security rules to the set of log files to generate a masked set of log files;
   receive a set of incident notes associated with the cloud platform;
   apply the set of data security rules to the set of incident notes to generate a masked set of incident notes;
   receive at least one voice recording associated with the cloud platform; and
   train the machine learning model using a first set of matrices, a second set of matrices, and a third set of matrices,
      wherein the third set of matrices is derived from at least one transcript associated with the at least one voice recording.

3. The system of claim 2, wherein the one or more processors are configured to:
   apply the set of data security rules, to the at least one transcript, to generate at least one masked transcript,
      wherein the third set of matrices is derived from the at least one masked transcript.

4. The system of claim 2, wherein the one or more processors are configured to:
   segment the set of masked log files by a set of time windows,
      wherein the first set of matrices correspond to the set of time windows.

5. The system of claim 2, wherein the one or more processors, to receive the set of incident notes, are configured to:
   receive a set of tickets, associated with cloud platform, that include at least a portion of the set of incident notes; and
   receive a set of chat logs, associated with the cloud platform, that include at least the portion of the set of incident notes.

6. The system of claim 1, wherein the set of data security rules comprises a plurality of patterns and a set of masking characters.

7. The system of claim 1, wherein the cloud platform comprises a set of cloud applications that support a plurality of clients.

8. The system of claim 7, wherein the plurality of clients include a web-based interface, a mobile application, or an application programming interface.

9. A method of automated remediation to increase resiliency of a cloud platform, comprising:
   receiving, from a set of monitoring software and at a remediation system, information associated with the cloud platform;
   applying, by the remediation system, a set of data security rules to the information to generate masked information;
   providing, by the remediation system, the masked information to a machine learning model to receive a classification associated with the masked information and an indication of a suggested remediation action, wherein the classification is associated with an error; and
   transmitting, from the remediation system and to the cloud platform, a command to perform the suggested remediation action based on determining that the classification is associated with the error.

10. The method of claim 9, wherein the classification comprises a binary classification indicating whether the error is present.

11. The method of claim 9, wherein the classification comprises a multi-class classification indicating a type of the error.

12. The method of claim 9, wherein providing the masked information to the machine learning model to receive the classification and the suggested remediation action comprises:
   transmitting, to a machine learning host associated with the machine learning model, a request including the masked information; and
   receiving, from the machine learning host, a response indicating the classification and the suggested remediation action.

13. The method of claim 9, wherein receiving the information associated with the cloud platform comprises:
   receiving a set of log files associated with the cloud platform.

14. The method of claim 9, wherein receiving the information associated with the cloud platform comprises:
   receiving at least one voice recording associated with the cloud platform.

15. A non-transitory computer-readable medium storing a set of instructions for generating remediation suggestions to increase resiliency of a cloud platform, the set of instructions comprising:
   one or more instructions that, when executed by one or more processors of a device, cause the device to:

receive, from a set of monitoring software, information associated with the cloud platform;

apply a set of data security rules to the information to generate masked information;

provide the masked information to a machine learning model to receive an indication of a suggested remediation action;

transmit, to an administrator device, a user interface indicating the suggested remediation action;

receive, from the administrator device, an approval of the suggested remediation action; and transmit, to the cloud platform, a command to perform the suggested remediation action in response to the approval.

16. The non-transitory computer-readable medium of claim 15, wherein the one or more instructions, that cause the device to receive the approval, cause the device to:

receive, from the administrator device, an indication of an interaction with the user interface, wherein the indication of the interaction comprises the approval.

17. The non-transitory computer-readable medium of claim 15, wherein the information comprises a set of log files associated with the cloud platform or at least one voice recording associated with the cloud platform.

18. The non-transitory computer-readable medium of claim 15, wherein the one or more instructions, when executed by the one or more processors, cause the device to:

provide the suggested remediation action and the approval to the machine learning model for retraining or refinement.

19. The non-transitory computer-readable medium of claim 15, wherein the one or more instructions, that cause the device to apply the set of data security rules, cause the device to:

mask at least one sensitive field in the information to generate the masked information.

20. The non-transitory computer-readable medium of claim 15, wherein the command comprises a command to restart a cloud application, update the cloud application, reroute application programming interface calls, or initiate new application programming interface instances.

* * * * *